W. B. GUERNSEY.
ELECTROMAGNETIC BURGLAR ALARM.
No. 4,297. Reissued Mar. 14, 1871.
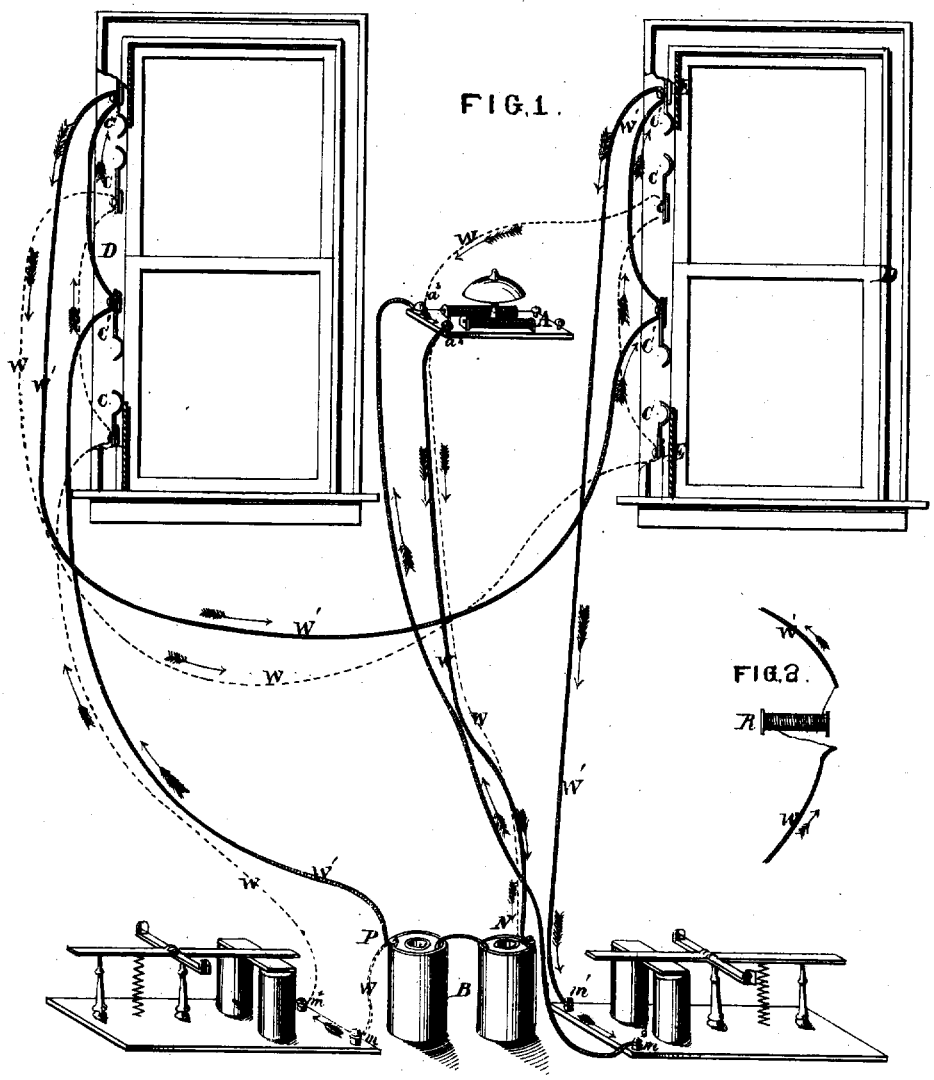
WITNESSES.
J. Scheitlin
Wm. H. Brereton Jr.
INVENTOR.
Wm. B. Guernsey
By Knight Bros
Attorneys
THE NORRIS PETERS CO., PHOTO-LITHO., WASHINGTON, D. C.

United States Patent Office.

WILLIAM B. GUERNSEY, OF JERSEY CITY, NEW JERSEY, ASSIGNOR TO CYRUS B. MARTIN, OF NEWBURG, NEW YORK.

Letters Patent No. 108,257, dated October 11, 1870; reissue No. 4,297, dated March 14, 1871.

IMPROVEMENT IN ELECTRO-MAGNETIC BURGLAR-ALARMS.

The Schedule referred to in these Letters Patent and making part of the same.

I, WILLIAM B. GUERNSEY, of Jersey City, in the county of Hudson and State of New Jersey, have invented a new and useful Improvement in Electro-magnetic Alarms, of which the following is a specification.

*Nature and Objects of my Invention.*

The principal object of my invention is to provide an electrical apparatus which will give an alarm or an indication either in the event of the conducting-circuit being broken or in the event of a new or shorter circuit being formed.

To this end I employ a continuous circuit or a circuit capable of being made continuous at will, arranged with a resistance or resistances, so that the current which is allowed to pass will not possess sufficient electro-motive force to affect the alarm, but having such arrangements at windows and doors and other places to be guarded as will, on any tampering therewith, short-circuit the current past or around the said resistance or resistances to an extent sufficient to actuate the alarm.

My invention thus combines the advantages and avoids the disadvantages of the two varieties of electro-magnetic alarms which are distinguished as the closed-circuit system and the open-circuit system.

I will proceed to describe a way of carrying out my invention by the use of two separate electro-magnets, each of which may constitute a resistance to prevent the sounding of an alarm until the circuit is either made around or past such resistance or broken.

More than one magnet or resistance is not essential in carrying out the invention, as will be understood from the following explanation.

*Description of Accompanying Drawing.*

Figure 1 shows, in perspective, two electro-magnets, with separate conductors connected with a common battery, each conductor passing through an alarm and through suitable connection devices, which may be located in the frames of windows, or at any desired points, in such a manner that the opening of a door or window, or the performance of any act which it is desired to detect, will connect one conductor with the other and avoid both electro-magnets. For this purpose the magnet of one conductor is located near the positive-pole, and that of the other near the negative-pole of the battery.

Figure 2 illustrates a modification, in which one magnet may be dispensed with and a simple resistance-coil introduced at the point to be protected in such a manner that the act to be detected will close a short-circuit, avoiding the resistance, and thus sounding the alarm. This more simple form of the apparatus is applicable to places where a single window, door, or other object is to be protected.

*General Description.*

P represents the positive, and N the negative-pole of a battery, B.

Of the full lines W′ and the dotted lines W, each represent a continuous conductor, passing through the alarm A, through one or the other of the magnets M M′, and one or the other of the connection-springs C C′, which are arranged in pairs in the frame of the windows D in such a manner that the opening of either window will, through the medium of the connecting-plates E, unite the two conductors.

It will be seen that there are two wire conductors leading about the house or premises to be guarded, from the positive-pole P of the battery shown, to and through the bell or alarm, and thence returning to the negative-pole N of the said battery.

One of these conductors, W, indicated by a dotted line, leads direct from the battery to and through one of the resistance-magnets, M, entering at the binding-screw $m$ and leaving from the binding-screw $m^{\times}$, and thence to each of the four connecting-springs, shown at C C C C, at the two windows; thence from the last of said springs to the binding-screw $a^3$ of the bell, and so through the bell-magnet and out at the binding-screw $a^4$, and onto the other pole of the battery; but the other conductor, W′, marked with a heavy line in the drawing, leads to its connecting-springs C′ C′ C′ C′ first, and then to and through its own resistance-magnet M′. From this magnet the said conductor leads to and through the bell-magnet to the battery in the same manner and direction as the other.

The severing of either of the said conductors or the short or cross-circuiting of them would deprive one or both of the said resistance-magnets of magnetism, with the consequent release of the armature or armatures; and such release can easily, by known means, as by use of "local" battery, or clock-work, or other contrivances, be made to sound an alarm.

It will also be seen that the movement of either sash, shown to an extent sufficient to make contact between the two spring-connections in either frame by the metal strips E, shown upon each sash, will, by allowing a current to pass through the bell-magnet unimpeded by the said resistances, cause the bell to ring. In other words, the bell-magnet, having small resistance, is not influenced by a current which has first been obliged to pass through a much greater resistance, but is readily influenced by the short-circuit when the resistances are eliminated.

If the battery B be used also as a local battery for the purpose of ringing the bell upon completion of local circuits or circuit by the release of armatures or armature, such ringing will therefore become continuous and will be uninfluenced by any subsequent manipulation of the alarm or its connections, except at the instrument.

Two magnets and two conducting-wires are shown and described, but only one magnet or other electro-motor and one conducting-wire is necessary to accomplish the same effect, as will be manifest by an examination of the arrangement and a knowledge of the principles involved.

The location, with regard to each other, of the various members or elements of the alarm is not an essential part of the invention and can be varied as circumstances dictate.

Where but a single place is to be protected, as for example, for the vault door of a bank, the apparatus may be simplified, dispensing with one of the resistance-magnets and employing a simple resistance, R, fig. 2, placed at the point to be protected, and so arranged with regard to the other members of the alarm that the opening of the door or window, or the doing of any act which the alarm is to detect, will short-circuit the conductor by forming a connection between the wires, across, or independently of the resistance.

Various other modifications will readily suggest themselves for the accomplishment of the object without departing from the essential principles of the invention, the design being to obtain an alarm in which the signals shall be given by the closing or making of connection between two different conductors, or between two parts of the same conductor essentially as is done in the open or interrupted circuit-alarms, while at the same time there is or may be a continuous circuit in the said conductor or conductors, which, by proper contrivances, may be made to give notice to the person in charge of said alarm of any injury, accidental or malicious, which may have happened to his instrument or its belongings.

*Claims.*

I claim as my invention—

1. A continuous conductor or conductors, the severing of which or of either of them will cause an alarm to be sounded, said conductor or conductors being arranged in relation to the several elements of the alarm in such manner that the short-circuiting of such conductors, or of the two parts of such single conductor, shall also cause an alarm; an electrical conductor or conductors (for protective purposes) which, or the parts of which, are so arranged with regard to the other elements of the alarm that they can neither be severed nor short-circuited without causing an alarm.

2. In an alarm such arrangement of continuous conductors, or of a conductor which cannot be severed without causing an alarm, with regard to the various points to be protected, that the attempting of acts which the contrivance is intended to prevent will create a short-circuit between such conductors or between two parts of a single conductor, and so cause an alarm to be sounded.

3. The combination, in an electro-magnetic alarm, of a continuous circuit or circuits with a sufficient resistance or resistances, and an alarm or alarms, when the said combination is so arranged that the severing or interrupting of the said circuits, or of either of them, shall cause the said alarm or alarms to sound; and also, that the short-circuiting or diverting the course of the electrical current in said circuit or circuits around or past the said resistance or resistances shall sound an alarm, or cause an alarm to be sounded, this when the whole arrangement is properly combined with a sufficient battery, and with "connections" or contrivances at points to be guarded, which will, upon the doing of certain acts, or the happening of certain things, short-circuit the said electrical current or currents past or around the said resistance or resistances, and so give the desired alarm.

4. In a burglar or fire-alarm, the combination of an open and a closed circuit to operate substantially as set forth.

W. B. GUERNSEY.

Witnesses:
WM. H. BRERETON, Jr.,
OCTAVIUS KNIGHT.